July 3, 1951
L. J. EBERT
2,559,288
SEPARABLE AND DEMOUNTABLE TIRE RIM
Filed Nov. 15, 1948
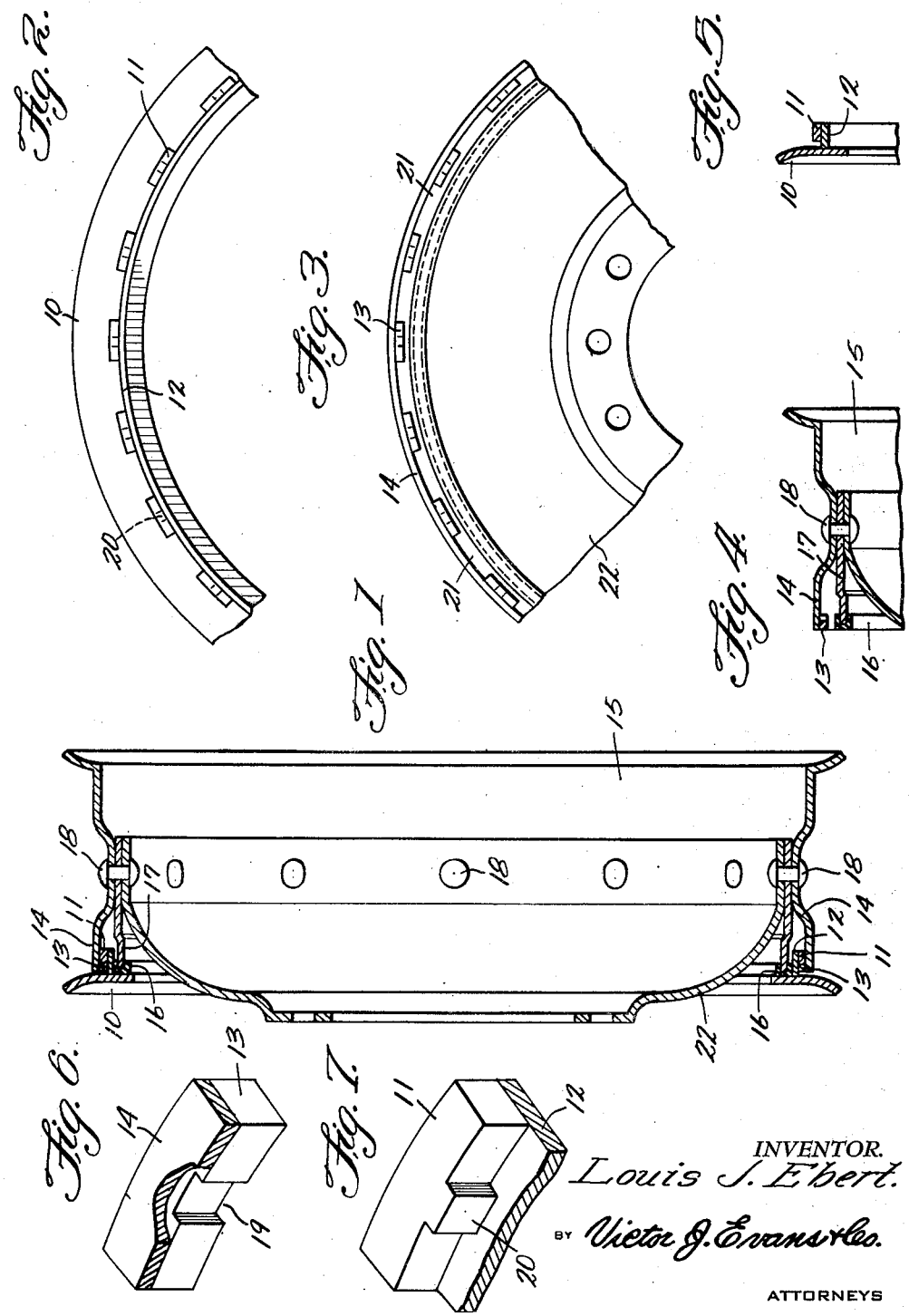
INVENTOR.
Louis J. Ebert.
BY Victor J. Evans & Co.
ATTORNEYS Patented July 3, 1951

2,559,288

UNITED STATES PATENT OFFICE 2,559,288

SEPARABLE AND DEMOUNTABLE TIRE RIM

Louis J. Ebert, Little Valley, N. Y.

Application November 15, 1948, Serial No. 60,145

5 Claims. (Cl. 152—412)

This invention relates to locking devices for securing tires on rims of motor vehicle wheels, and in particular includes a removable tire retaining flange having interlocking lugs wherein one set of lugs is inserted through openings in the rim of the wheel and these are locked in lugs in the rim by turning the said removable flange in relation to the rim.

The purpose of this invention is to provide an improved removable tire retaining flange for rims of motor vehicle wheels which is positively secured in place without nuts and bolts or springs and without the use of tools.

In the usual motor vehicle wheel rim having a removable tire retaining flange the flange is either split or secured in position by nuts and bolts, or where it is secured by interengaging elements there is danger of the flange working loose and releasing the tire. With this thought in mind this invention contemplates an improved tire retaining flange for rims of motor vehicle wheels wherein interengaging locking lugs are snapped into the locking position and once they are in place it is substantially impossible for the flange to work loose.

The object of this invention is therefore to provide improved locking means for positively retaining removable tire retaining flanges on the rims of motor vehicle wheels wherein the parts remain in the locked position until manually released.

Another object of the invention is to provide an improved locking means for holding a removable tire retaining flange on rims of motor vehicle wheels which may be incorporated in the wheel with very little change in the construction thereof.

A further object of the invention is to provide positive locking means for holding removable tire retaining flanges of rims of motor vehicle wheels which is of a comparatively simple and economical construction.

With these and other objects and advantages in view the invention consists of the new and useful combination, construction and arrangement of parts as hereinafter more fully described, set forth in the claims appended hereto and disclosed in the accompanying drawings forming part hereof, wherein:

Figure 1 is cross section through the rim of a motor vehicle wheel showing the parts assembled;

Figure 2 is a detail looking toward the inner surface of the removable tire retaining flange with parts of the flange broken away;

Figure 3 is a similar detail looking toward a corresponding portion of the wheel rim and web showing the position of the retaining lugs in the rim and with part of the rim broken away;

Figure 4 is a cross section through the rim of the wheel with the tire retaining flange removed and with parts of the wheel broken away;

Figure 5 is a cross section through the tire retaining flange showing the locking lugs thereon with part of the flange broken away;

Figure 6 is a detail illustrating one of the locking lugs of the rim of the wheel with parts of the rim shown in combination therewith and with parts broken away and shown in section in order to illustrate the lug receiving notches in the lugs; and Figure 7 is of similar detail showing one of the lugs of the removable tire retaining flange with part of the flange shown in combination therewith and wherein the flange is shown in section.

Referring now to the drawings wherein like reference characters denote corresponding parts, the improved locking means for removable flanges of rims of motor vehicle wheels of this invention includes a flange 10 having lugs 11 on an annular extending ring 12, lugs 13 on a cylindrical band 14 of the rim of a wheel 15 and an elastic ring 16 which is U-shaped in cross section and which is mounted on an inner annular web 17 that is secured in the rim of the wheel by bolts 18.

The lugs 13 are provided with notches 19 in their inner surfaces and the lugs 11 are provided with tongues 20 that are positioned in the notches 19 when the flange 10 is locked on the wheel. To remove the flange from the wheel it is pressed inwardly until the tongues 20 pass out of the notches 19 and the flange is then turned slightly until the lugs 11 register with the openings 21 between the lugs 13. With the lugs 11 positioned in the openings 21, the flange 10 may readily be removed.

In mounting the tire retaining flange 10 on the rim of the wheel, the flange is held with the lugs 11 registering with the spaces 21 between lugs 13 and the flange is then pressed inward against the elastic ring 16 and turned either clockwise or counter-clockwise until the tongues 20 snap into the notches 19. The flange 10 is then positively secured in place and the tire which is positioned on the rim between the flange 10 and a permanent flange on the opposite edge of the cylindrical band of the rim may be inflated.

The ring 16 is formed of rubber or other resilient material and, as shown in Figure 1, this ring constantly urges the flange 10 outwardly thereby positively locking the tongues 20 in the notches 19 and in addition thereto seals the annular openings in the rim against moisture.

In the design shown the wheel rim is provided with a mounting web 22 and it will be understood that the wheel may be of any type or design.

It will also be understood that modifications may be made in the design and arrangement of the parts without departing from the spirit of the invention.

What is claimed is:

1. A motor vehicle wheel rim including an annular tire mounting cylindrical band with a permanent flange on one edge, spaced lugs with notches in the laterally disposed inner surfaces thereof on the radially disposed inner surface of the edge of said tire mounting band opposite to the edge on which the permanent flange is positioned, a removable tire retaining flange having an extended annular ring on the laterally disposed inner surface, spaced lugs with tongues on the laterally disposed outer surfaces positioned on the edge of the ring of the said tire retaining flange and positioned with the tongues thereof in registering relation with the notches of the lugs on the tire mounting cylindrical band, a radially disposed inner annular web spaced from the tire mounting band and also positioned on the side of the band of the wheel rim opposite to that on which the permanent flange is positioned and a resilient ring carried by the edge of the said inner annular web urging the said tongues of the lugs on the ring of the flange in locking engagement with the notches of the lugs of the band of the rim.

2. A motor vehicle wheel rim including an annular tire mounting cylindrical band thereon with a permanent flange on one edge, spaced lugs with notches in the laterally disposed inner surfaces thereof on the radially disposed inner surface of the edge of said tire mounting band opposite to the edge on which the permanent flange is positioned, a removable tire retaining flange having an extended annular ring on the laterally disposed inner surface, spaced lugs with tongues on the laterally disposed outer surfaces positioned on the edge of the ring of the said tire retaining flange and positioned with the tongues thereof in registering relation with the notches of the lugs on the cylindrical band, a radially disposed inner annular web spaced from the tire mounting band and also positioned on the side of the band of the wheel rim opposite to that on which the permanent flange is positioned of the rim, and a resilient ring carried by the edge of the said inner annular web urging the said tongues of the lugs on the ring of the flange in locking engagement with the notches of the lugs of the cylindrical band of the rim, said lugs on the ring of the flange positioned to pass between the lugs on the band of the rim of the wheel.

3. A motor vehicle wheel rim including an annular tire mounting cylindrical band with a permanent flange on one edge, spaced lugs with notches in the laterally disposed inner surfaces thereof on the radially disposed inner surface of the edge of said tire mounting band opposite to the edge on which the flange is positioned, a removable tire retaining flange having an extended annular ring on the laterally disposed inner surface, spaced lugs with tongues on the laterally disposed outer surfaces positioned on the edge of the ring of the said tire retaining flange and positioned with the tongues thereof in registering relation with the notches of the lugs on the band of the rim, and a rubber ring U-shaped in cross section mounted on a radially disposed annular web of the rim and positioned to engage the inner surface of the tire retaining flange urging the tongues of the lugs of the ring of the flange in locking engagement with the notches of the lugs of the band of the rim of the wheel.

4. A motor vehicle rim including an annular tire mounting cylindrical band with a permanent flange at one side, a plurality of spaced lugs with notches in the laterally disposed inner surfaces thereof on the edge of the said tire mounting band opposite to that on which the flange is positioned, a removable tire retaining flange having an extended annular ring on the laterally disposed inner surface thereof, spaced lugs with tongues on the laterally disposed outer surfaces on the edge of the ring of the tire retaining flange and positioned to pass between the lugs on the tire mounting band of the rim, said rim having a radially disposed inner annular web concentric with the tire mounting band and spaced inwardly therefrom, a rubber ring U-shaped in cross section, positioned on the edge of the said radially disposed inner annular web and positioned to engage the inner laterally disposed surface of the tire retaining flange resiliently urging the flange laterally outwardly wherein the tongues of the lugs on the ring of the flange are in locking engagement with the notches of the lugs of the cylindrical band of the rim of the wheel.

5. In a motor vehicle wheel, the combination which comprises a rim having an annular mounting cylindrical band with a permanent flange at one side, a removable tire retaining flange having a laterally inwardly extended annular ring thereon positioned on the opposite side of the rim, said ring of the tire retaining flange and tire mounting band having interengaging lugs on adjoining surfaces thereof, a radially disposed inner annular web spaced from the mounting band and positioned on the side of the rim opposite to that on which the permanent flange is positioned, and a U-shaped rubber ring carried by the radially disposed inner annular web resiliently urging said tire retaining flange away from the rim to hold the said interengaging lugs in locking engagement.

LOUIS J. EBERT.

REFERENCES CITED

The following references are of record in the file of this patent:

UNITED STATES PATENTS

| Number | Name | Date |
| --- | --- | --- |
| 895,762 | Jeffery | Aug. 11, 1908 |
| 1,981,776 | Boyd | Nov. 20, 1934 |